United States Patent
Zettler et al.

(10) Patent No.: US 8,388,219 B2
(45) Date of Patent: Mar. 5, 2013

(54) METHOD FOR CALIBRATING A PYROMETER, METHOD FOR DETERMINING THE TEMPERATURE OF A SEMICONDUCTING WAFER AND SYSTEM FOR DETERMINING THE TEMPERATURE OF A SEMICONDUCTING WAFER

(75) Inventors: Joerg-Thomas Zettler, Berlin (DE); Tobias Schenk, Berlin (DE); Steffen Uredat, Berlin (DE); Jens Zilian, Berlin (DE); Bernd Henninger, Berlin (DE); Marcello Binetti, Berlin (DE); Kolja Haberland, Berlin (DE)

(73) Assignee: Laytec Aktiengesellschaft, Berlin (DE)

( * ) Notice: Subject to any disclaimer, the term of this patent is extended or adjusted under 35 U.S.C. 154(b) by 396 days.

(21) Appl. No.: 12/777,661

(22) Filed: May 11, 2010

(65) Prior Publication Data
US 2010/0290500 A1 Nov. 18, 2010

(30) Foreign Application Priority Data

May 12, 2009 (DE) .......................... 10 2009 003 041
Jun. 18, 2009 (DE) .......................... 10 2009 029 859
Sep. 17, 2009 (EP) ..................................... 09170604

(51) Int. Cl.
G01K 15/00 (2006.01)
G01K 5/00 (2006.01)
G01K 5/08 (2006.01)

(52) U.S. Cl. ..................................... 374/2; 374/E15.001
(58) Field of Classification Search ................... 374/1, 2, 374/126, 127, 128, E15.001, E15.002; 250/252.1; 356/43, 45
See application file for complete search history.

(56) References Cited

U.S. PATENT DOCUMENTS

| | | | | |
|---|---|---|---|---|
| 3,454,769 A * | 7/1969 | Dynes | ........................... | 374/125 |
| 4,880,314 A * | 11/1989 | Kienitz | ........................ | 374/129 |
| 4,881,823 A * | 11/1989 | Tanaka et al. | ................ | 374/126 |
| 5,553,939 A | 9/1996 | Dilhac et al. | | |
| 5,690,429 A * | 11/1997 | Ng | ..................................... | 374/1 |
| 6,682,216 B1 | 1/2004 | Small, IV et al. | | |
| 7,734,439 B2 * | 6/2010 | Timans | ........................... | 702/99 |
| 7,957,926 B2 * | 6/2011 | Timans | ........................... | 702/99 |
| 2002/0051481 A1 | 5/2002 | Shibata et al. | | |
| 2006/0171442 A1 | 8/2006 | Volf et al. | | |
| 2007/0291816 A1 * | 12/2007 | Volf et al. | ......................... | 374/1 |

FOREIGN PATENT DOCUMENTS

JP 2003 106901 9/2003

* cited by examiner

*Primary Examiner* — R. A. Smith
(74) *Attorney, Agent, or Firm* — Novak Druce Connolly Bove + Quigg LLP

(57) ABSTRACT

A method for calibrating a pyrometer a temperature of a calibration sample is determined from the ratio of a first reflectance and a second reflectance and the pyrometer is calibrated by assigning the determined temperature of the calibration sample with a thermal radiation signal measured by the pyrometer.

15 Claims, 3 Drawing Sheets

METHOD FOR CALIBRATING A PYROMETER, METHOD FOR DETERMINING THE TEMPERATURE OF A SEMICONDUCTING WAFER AND SYSTEM FOR DETERMINING THE TEMPERATURE OF A SEMICONDUCTING WAFER

CROSS-REFERENCE TO RELATED APPLICATIONS

This application claims priority to German Patent Application 102009003041.7, filed May 12, 2009, German Patent Application 102009029859.2, filed Jun. 18, 2009 and European Patent Application 09170604.4, filed Sep. 17, 2009, the entire contents of each are incorporated herein by reference.

BACKGROUND OF THE INVENTION

1. Field of the Invention

The present invention relates to a method for calibrating a pyrometer, a method for determining the temperature of a semiconducting wafer and a system for determining the temperature of a semiconducting wafer.

2. Description of Related Art

Measurements of the temperature of a semiconducting wafer belong to the most important tools during quality control in the semiconductor production.

In many applications, the semiconductor production is realised within a processing chamber and the temperature of the semiconducting wafer which is processed inside the processing chamber is contactlessly measured by use of a pyrometer which is adapted to intercept and measure the thermal radiation which is emitted by the semiconducting wafer. Said thermal radiation is then used to calculate the temperature of the semiconducting wafer. Due to the high temperatures inside the processing chamber, the pyrometer is advantageously located outside the processing chamber and said thermal radiation passes through a window of the processing chamber before entering the pyrometer.

However, the geometry inside the processing chamber may change for different applications, for example due to different sizes or positions of semiconducting wafers inside the chamber. Such different geometrical parameters may result in different outcoupling characteristics of the thermal radiation from the semiconducting wafer to the pyrometer through the window of the processing chamber. Also, the optical transmission characteristics of the window of the processing chamber itself may change, for example due to process related window coating. Such optical transmission characteristics may also result in different outcoupling characteristics of thermal radiation from the semiconducting wafer to the pyrometer through the window of the processing chamber. A variation of the outcoupling characteristics may however severely affect the accuracy of the determination of the temperature of the semiconducting wafer. Therefore it is necessary to re-calibrate the pyrometer before starting the temperature measurement, even if it has been carefully pre-calibrated on a separate calibration stage (i.e., a black-body reference light source) before.

A calibration process in the sense of the present invention is realised in that prior to the manufacturing process—including measurements of the temperature of a semiconducting wafer during manufacturing—a pyrometer is calibrated by providing a calibration sample inside the processing chamber. The calibration sample is a sample which preferably corresponds to a semiconducting wafer in terms of size and material, where said semiconducting wafer is intended to be manufactured after the calibration process. Therefore, once the calibration sample is heated to a known temperature value or to a plurality of known temperature values, said calibration sample can accurately simulate a thermal radiation which would be emitted by the real semiconducting wafer when being manufactured inside the processing chamber. The (so simulated) thermal radiation can be measured by the pyrometer which is located outside the processing chamber and the measured thermal radiation is then assigned with a certain temperature value or certain temperature values. Once, such assignment (also referred to as calibration) has been carried out, a semiconducting wafer can be manufactured inside the processing chamber and the temperature can be exactly derived from the thermal radiation measured by the pyrometer (which is located outside the processing chamber) during the manufacturing process because the measured thermal radiation can be re-assigned with accurate temperature values.

A conventional method for calibrating a pyrometer is described in more detail in connection with FIGS. 1 and 2. In order to carry out the above described calibration process it is necessary to exactly know the temperature of the calibration sample 12 without locating the pyrometer inside the processing chamber, so that the measured thermal radiation can be assigned with an accurate temperature value. Therefore, as illustrated in FIG. 1, the calibration sample 12 comprises a semiconducting wafer 2 such as a silicon substrate and a thin aluminium layer 3 disposed thereon. Further, a pyrometer 1 is provided which is adapted to intercept and measure thermal radiation and which is furthermore adapted to perpendicularly irradiate an optical radiation having a predetermined wavelength onto the calibration sample 12. During heating of the calibration sample 12, an eutectic reaction starts at exactly 577° C. where aluminium starts to diffuse into the silicon layer 2. Before the calibration sample 12 reaches a temperature of 577° C., the calibration sample 12 comprises a high reflectivity due to the thin aluminium layer 3. However, after reaching a temperature of 577° C., the aluminium layer completely diffuses into the silicon layer 2 and therefore the calibration sample 12 comprises a relatively low reflectivity. That is, the reflectivity significantly decreases at 577° C. which can be observed from outside of the processing chamber. Furthermore the pyrometer 1 measures the thermal radiation (besides the reflection signal) which is emitted from the calibration sample 12 and calculates the temperature of the calibration sample 12 using the measured thermal radiation. Once, the pyrometer has not been calibrated before—such as shown in FIG. 2—the pyrometer shows a nominal temperature of e.g. 500° C. while the reflectivity/reflectance significantly decreases (at 577° C.). Therefore, the thermal radiation which is measured at that time is assigned (calibrated) with the exact temperature of 577° C. Due to the fact that the temperature characteristics are exactly given by the Planck function, the complete temperature range of the pyrometer 1 can be calibrated using this single reference point of 577° C.

However, the above described conventional method of calibrating a pyrometer comprises the following disadvantages. The reaction characteristics of the eutectic reaction strongly depends on the thickness of the aluminium layer which makes it difficult to exactly determine the temperature of 577° C. from the reflection signal. Furthermore, the calibration sample comprises different heating characteristics than an identical silicon wafer without the aluminium layer (which is used during manufacturing) due to the different metallic radiation absorption inside the processing chamber. Furthermore the reaction characteristics of the eutectic reaction depend on the slope of the temperature ramping, thereby making it difficult to exactly determine the temperature of 577° C. from the reflection signal. Furthermore the reaction characteristics of the eutectic reaction depends on the area coverage ratio of the aluminium layer on the silicon wafer. Furthermore, the Al—Si eutectic point at 577° C. is relatively low and therefore methodical errors of the pyrometer calibration are amplified for high temperature processes (up to 1300° C.) resulting in temperature errors up to 30 K. More importantly, the calibration sample can be used only once because the aluminium layer is destroyed during the calibration process.

It is therefore an object of the present invention to provide a method for calibrating a pyrometer which overcomes the disadvantages of the prior art. It is another object of the present invention to provide a method for determining the temperature of a semiconducting wafer and a system for determining the temperature of a semiconducting wafer which comprise a more accurate, more reliable and more cost-effective calibration process.

SUMMARY OF THE INVENTION

According to a first aspect of the present invention, a method for calibrating a pyrometer is disclosed, wherein at least one measured thermal radiation signal is assigned with a temperature value of the pyrometer, the method comprising: providing a calibration sample, wherein the calibration sample comprises a semiconducting wafer and a transparent calibration layer disposed on the semiconducting wafer, heating the calibration sample, wherein during the heating process: irradiating a first optical radiation having a first wavelength onto the calibration sample, measuring a first reflection signal resulting from reflection of the first radiation on the calibration sample, and determining a first reflectance of the calibration sample for the first wavelength from the measured first reflection signal; and irradiating a second optical radiation having a second wavelength onto the calibration sample, the first wavelength and the second wavelength being different from each other, measuring a second reflection signal resulting from reflection of the second radiation on the calibration sample, and determining a second reflectance of the calibration sample for the second wavelength from the measured second reflection signal; and measuring, by the pyrometer, a thermal radiation signal received from the calibration sample, wherein a temperature value of the calibration sample is determined from the ratio of the first reflectance and the second reflectance and wherein the pyrometer is calibrated by assigning the determined temperature value of the calibration sample with the thermal radiation signal measured by the pyrometer.

Preferably, a plurality of temperature values are determined from a plurality of ratios of the first reflectance and the second reflectance (for different points in time while the calibration sample is heated) and wherein the pyrometer is calibrated by assigning the plurality of determined temperature values of the calibration sample with a plurality of thermal radiation signals measured by the pyrometer (at the time in which the first and second optical radiation is irradiated, respectively). In case more than one determined temperature value is assigned with the thermal radiation signal measured by the pyrometer, the plurality of temperature values are verified by comparing the pairs of temperature values/thermal radiation signals according to the Planck function and judging whether all pairs of temperature values/thermal radiation signals comply with the Planck function.

The heating process is preferably carried out in the range of 20° C.-1400° C., more preferably 500° C.-1200° C. and still more preferably 600° C.-900° C. Preferably, the first optical radiation and the second optical radiation are perpendicularly irradiated onto the calibration sample with respect to the surface of the calibration sample. Preferably, the calibration sample comprises a semiconducting wafer and a transparent calibration layer, both comprising completely planar surfaces. Preferably, the upper surface of the semiconducting wafer is completely covered by the transparent calibration layer. Alternatively it is preferred that at least 50% of the upper surface of the semiconducting wafer are covered by the transparent calibration layer.

Preferably the first reflection signal and the second reflection signal are measured by use of the same detector or by use of an equivalent detector. Preferably the steps of: irradiating the first optical radiation, measuring the first reflection signal, irradiating the second optical radiation, measuring a second reflection signal, and measuring the thermal radiation signal are simultaneously carried out. Preferably the calibration sample is continuously heated. Preferably the calibration sample is heated with a temperature gradient ranging between 0.1K/min and 10K/min. Preferably the calibration sample is continuously heated up to a temperature between 20° C.-1400° C., more preferably 500° C. 1200° C. and still more preferably 600° C.-900° C.

Preferably the refractive index of the transparent calibration layer varies with the temperature so that said first and second reflection signals, measured in a range in which the transparent calibration layer is transparent, will be modulated according to the temperature of the transparent calibration layer.

Preferably the transparent calibration layer comprises an optical transparency for the first optical radiation and/or the second optical radiation of more than 0.5, more preferably more than 0.7 and still more preferably of more than 0.9. Preferably the transparent calibration layer comprises a thickness ranging between 1 µm and 5 µm, more preferably between 2 and 4 µm. Preferably the transparent calibration layer consists of gallium nitride.

Preferably the calibration sample further comprises a transparent protection layer, the transparent protection layer being disposed on the transparent calibration layer. Preferably, the transparent protection layer is a planar layer. Preferably the transparent protection layer comprises an optical transparency for the first optical radiation and/or the second optical radiation of more than 0.5, more preferably more than 0.7 and still more preferably of more than 0.9. Preferably the transparent protection layer comprises a thickness ranging between 2 nm and 30 nm, more preferably between 10 and 20 nm. Preferably the transparent calibration layer consists of aluminium gallium nitride or aluminium nitride.

Preferably the first optical radiation and the second optical radiation have a central wavelength ranging between 380 nm and 1300 nm. Preferably the first optical radiation and the second optical radiation comprise a full width at half maximum (FWHM) ranging between 0.1 nm and 5 nm, more preferably ranging between 0.2 and 3 nm. Preferably the absolute value of the difference between the wavelength of the first optical radiation and the wavelength of the second optical radiation ranges between 20 nm and 600 nm, more preferably between 100 and 400 nm.

Preferably the method further comprises: continuously heating the calibration sample for a predetermined temperature range, and during the continuous heating process: continuously measuring a thermal radiation signal, continuously irradiating the first optical radiation having a first wavelength onto the calibration sample, continuously measuring the first reflection signal and continuously determining first reflectance values of the calibration sample, wherein a second temperature of the calibration sample is determined from a minimum or maximum of the reflectance values and wherein the second temperature is assigned with the measured thermal radiation signal which was measured during the time at which the minimum reflectance value was measured, and wherein the second temperature determined from the minimum of the reflectance values is compared with the first temperature determined from the ratio of the first reflectance and the second reflectance.

Generally, according to the present invention, a calibration process is realised in that prior to the manufacturing process—including measurements of the temperature of a semiconducting wafer during manufacturing—a pyrometer is calibrated by providing a calibration sample inside the processing chamber. The calibration sample is a sample which preferably corresponds to a semiconducting wafer in terms of size and material, where said semiconducting wafer is intended to be manufactured after the calibration process. Therefore, once the calibration sample is heated to a known temperature value or to a plurality of known temperature values, said calibration sample can accurately emit or through-pass a thermal radiation exactly as it would be emitted or through-passed by the real semiconducting wafer when being manufactured inside the processing chamber. The magnitude of the emitted/through-passed thermal radiation can be measured by the pyrometer which is located outside the processing chamber and the measured thermal radiation is then assigned to a certain temperature value or certain temperature values of the emitting semiconductor wafer or, in case this wafer is IR transparent (through-passing), of the hot susceptor just below the wafer. Once, such assignment (also referred to as calibration) has been carried out, a semiconducting wafer can be manufactured inside the processing chamber and the temperature can be exactly derived from the thermal radiation measured by the pyrometer (which is located outside the processing chamber) during the manufacturing process because the measured thei Trial radiation can be re-assigned with accurate temperature values.

According to a second aspect of the present invention, an apparatus adapted for determining the temperature of a semi-conducting wafer using the calibration according to the above described method is disclosed, the apparatus comprising: a pyrometer adapted to measure a first thermal radiation signal received from a calibration sample (during calibration), and adapted to measure a thermal radiation which is emitted by a semiconducting wafer (during manufacturing) due to its temperature, a first light source and a first optical detector, adapted to irradiate a first optical radiation having a first wavelength onto the calibration sample, measuring a first reflection signal resulting from reflection of the first radiation on the calibration sample, and determining a first reflectance of the calibration sample for the first wavelength from the measured first reflection signal, a second light source and a second optical detector, adapted to irradiate a second optical radiation having a second wavelength different from the first wavelength onto the calibration sample, measuring a second reflection signal resulting from reflection of the second radiation on the calibration sample, and determining a second reflectance of the calibration sample for the second wavelength from the measured first reflection signal.

Preferably, the apparatus further comprises a control unit adapted to calibrate the pyrometer according to the above described method.

Preferably the first optical detector is used as the detector of the pyrometer. Preferably the first optical detector is used as a first detector of the pyrometer and the second optical detector is used as a second detector of the pyrometer. Preferably the first optical detector is alternately switched in a first mode for measuring a thermal radiation which is emitted by the calibration sample due to its temperature and in a second mode for measuring a second reflection signal resulting from reflection of the second radiation on the calibration sample. Preferably the second optical detector is alternately switched in a first mode for measuring a thermal radiation which is emitted by the calibration sample due to its temperature and in a second mode for measuring a second reflection signal resulting from reflection of the second radiation on the calibration sample.

According to a third aspect of the present invention, a system adapted for determining the temperature of a semi-conducting wafer using the calibration according to the above described method is disclosed, the system comprising: a calibration sample, wherein the calibration sample comprises a semiconducting wafer and a transparent calibration layer disposed on the semiconducting wafer, a pyrometer adapted to intercept and measure thermal radiation, and adapted to measure a first thermal radiation signal received from the calibration sample (during calibration), and adapted to measure a thermal radiation which is emitted by the semiconducting wafer (during manufacturing) due to its temperature, a first light source and a first optical detector, adapted to irradiate a first optical radiation having a first wavelength onto the calibration sample, measuring a first reflection signal resulting from reflection of the first radiation on the calibration sample, and determining a first reflectance of the calibration sample for the first wavelength from the measured first reflection signal, a second light source and a second optical detector, adapted to irradiate a second optical radiation having a second wavelength different from the first wavelength onto the calibration sample, measuring a second reflection signal resulting from reflection of the second radiation on the calibration sample, and determining a second reflectance of the calibration sample for the second wavelength from the measured first reflection signal.

Preferably the system further comprises a control unit adapted to calibrate the pyrometer according to the above described method.

Preferably the first optical detector is used as the detector of the pyrometer. Preferably the first optical detector is used as a first detector of the pyrometer and the second optical detector is used as a second detector of the pyrometer. Preferably the first optical detector is alternately switched in a first mode for measuring a thermal radiation which is emitted by the calibration sample due to its temperature and in a second mode for measuring a second reflection signal resulting from reflection of the second radiation on the calibration sample. Preferably the second optical detector is alternately switched in a first mode for measuring a thermal radiation which is emitted by the calibration sample due to its temperature and in a second mode for measuring a second reflection signal resulting from reflection of the second radiation on the calibration sample.

According to a fourth aspect of the present invention, a method for calibrating a pyrometer is disclosed, wherein at least one measured thermal radiation signal is assigned with a temperature value. The method comprising: a) providing an integrating sphere inside a processing chamber, irradiating homogeneously through a window plate infra-red radiation exactly corresponding to a predetermined radiation-temperature, wherein the infra-red radiation which is irradiated into the integrating sphere is calibrated and stabilized according to the predetermined temperature using for stabilization a detector which is located inside the integrating sphere, b) measuring, by the pyrometer which is located outside of the processing chamber, the infra-red radiation signal of the integrating sphere through a window of the processing chamber, determining a radiation-temperature of the integrating sphere from measured radiation signal of the integrating sphere, and c) calibrating the pyrometer by assigning the pre-determined radiation-temperature of the integrating sphere with the thermal radiation signal measured by the pyrometer.

According to this aspect, the integrating sphere comprises a transparent window plate having light scattering properties similar to the semiconducting wafer that is intended to be manufactured after the calibration process in terms of size. That is, the surface area of the semiconducting wafer corresponds with the surface area of the opening of the integrating sphere and/or the surface area of the semiconducting wafer corresponds with the surface area of the opening of the calibration sample. Preferably, the integrating sphere is located at the same position inside the processing chamber as the semiconducting wafer will be positioned in the following manufacturing process. Preferably the opening of the integrating sphere faces towards that window of the processing chamber through which the thermal radiation is received by the pyrometer. Preferably the intensity of the radiation emitted by the integrating sphere can be controlled and adjusted. Preferably the wavelength of the radiation emitted by the integrating sphere is the same as the detection wavelength of the pyrometer, i.e. the wavelength for which the detection of the pyrometer is adapted (or most accurate).

Preferably, the integrating sphere (and also the processing chamber) is not heated during the calibration process. Only due to the emission out of the integrating sphere, the integrating sphere is identical with a "hot" wafer in terms of thermal radiation. That is, the integrating sphere simulates a semiconducting wafer of a predetermined (known) temperature in terms of thermal radiation. The radiation density is preferably adjusted (by comparison with a calibration radiation source) to the radiation density (according to the Planck function) of a predetermined (known) temperature. The integrating sphere preferably comprises a detector which measures the radiation density inside the integrating sphere and furthermore a controller is provided which is adapted to control the radiation density of the light source which illuminates the integrating sphere such that the maximum radiation density inside the integrating sphere is stabilised according to the predetermined (known) temperature. The radiation density may (initially) vary for example due to geometrical provisions such as reflections from the window or the inner wall of the processing chamber. However, in case the radiation density inside the integrating sphere is stabilised according to a predetermined temperature, such variations are compensated. Due to the above, the window plate of the integrating sphere becomes a "cold" (i.e. not necessarily heated) homogenous radiating surface which simulates a "hot" homogeneous (thermally) radiating (or susceptor radiation through-passing) semiconductor wafer inside the processing chamber. Therefore the pyrometer can be calibrated using the predefined thermal radiation (corresponding to a predefined temperature of the wafer) by assigning the predefined thermal radiation with a predefined temperature. Later temperature measurements of the semiconducting wafer during the manufacturing process of the wafer may be accurately carried out by measuring the thermal radiation of the semiconducting wafer by the pyrometer and re-assigning the measured thermal radiation signal with a temperature that is derived from the Planck function and the assigned value(s).

Preferably the integrating sphere is controlled to emit thermal radiation according to a plurality of predetermined temperature values and the pyrometer is calibrated by assigning the plurality of measured thermal radiation signals with a plurality of predetermined temperature values. In case more than one determined temperature value is assigned, the plurality of temperature values are verified by comparing the pairs of temperature values/thermal radiation signals according to the Planck function and judging whether all pairs of temperature values/thermal radiation signals comply with the Planck function. The integrating sphere is preferably controlled to emit thermal radiation heating according to a temperature range of 20° C.-1400° C., more preferably 500° C.-1200° C. and still more preferably 600° C.-900° C.

According to a fifth aspect of the present invention, a method for determining the temperature of a semiconducting wafer which is located within a processing chamber by using a pyrometer, the method comprising: calibrating the pyrometer, measuring a thermal radiation which is emitted by the semiconducting wafer due to its temperature by using the pyrometer during growing (manufacturing) the wafer, wherein the pyrometer is located outside of the processing chamber and the thermal radiation is received by the pyrometer after passing through a window of the processing chamber, and determining the temperature of the semiconducting wafer from the measured thermal radiation, wherein the pyrometer is calibrated according to at least one of the above described methods.

Preferably, the pyrometer is calibrated according to the method of the first aspect of the invention. More preferably, the pyrometer is calibrated according to the method of the first aspect of the invention and the calibration is verified using the method of the fourth aspect of the invention.

Alternatively, the pyrometer is calibrated according to the method of the fourth aspect of the invention. Then, more preferably, the calibration is verified using the method of the first aspect of the invention.

According to a sixth aspect of the present invention, a method for determining the temperature of a semiconducting wafer is disclosed, wherein a non-coated semiconducting wafer is provided within a processing chamber, the method comprising: heating the non-coated semiconducting wafer which is grown/manufactured to a predetermined temperature, measuring, by the pyrometer, a first thermal radiation signal of a first wavelength of the non-coated semiconducting wafer, and measuring, by the pyrometer, a second thermal radiation signal of a second wavelength of the non-coated semiconducting wafer, the first wavelength and the second wavelength being different from each other, determining a temperature of the non-coated semiconducting wafer from the ratio of the first thermal radiation signal and the second thermal radiation signal.

Preferably the absolute amount of the difference of the first wavelength and the second wavelength is greater than 50 nm, more preferably greater than 100 nm and still more preferably greater than 200 nm.

According to this aspect, the exact temperature of the non-coated semiconducting wafer can be accurately determined from the ratio of the first thermal radiation signal and the second thermal radiation signal. It was found that the single intensity (i.e. the intensity of the first thermal radiation or the intensity of the second thermal radiation signal) may significantly vary according to geometrical parameters of the apparatus—such as transmission of the window, reflections inside the processing chamber or the position of the wafer—however the ratio of both intensities of different wavelength is not variable with respect to said geometrical parameters. Due to the fact that the 2-wavelength-pyrometer-signal (i.e. the ratio of both intensities) is calibrated in advance by assigning predetermined temperature to certain ratios of both intensities, the exact temperature of the wafer can be determined during the manufacturing process.

Preferably, the pyrometer is calibrated according to the method of the first aspect and/or fourth aspect of the invention. More preferably, the calibration is verified using the method of the other one of first aspect and/or fourth aspect of the invention.

Preferably, during manufacturing of the semiconducting wafer, the temperature of the semiconducting wafer is determined according to the method of the fifth aspect of the invention and preferably the temperature of the semiconducting wafer is verified according to the method of the sixth aspect of the invention.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE DRAWINGS

In the following detailed description, only certain exemplary embodiments of the present invention are shown and described, by way of illustration. As those skilled in the art would recognize, the invention may be embodied in many different forms and should not be construed as being limited to the embodiments set forth herein.

Figure 1:
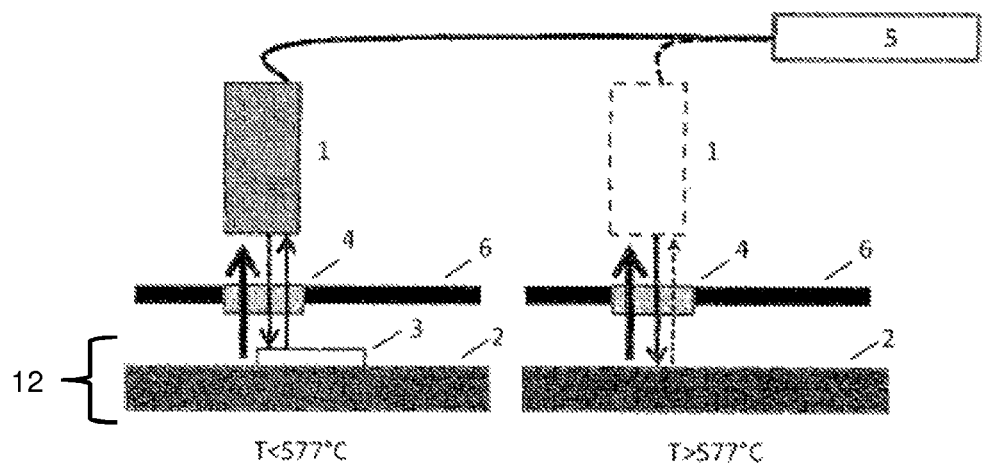
FIG. 1 shows a conventional apparatus for calibration of a pyrometer and illustrates the related conventional method for calibration of a pyrometer, FIG. 2 the measured and determined data according to the conventional method described in connection with FIG. 1.
Figure 2:
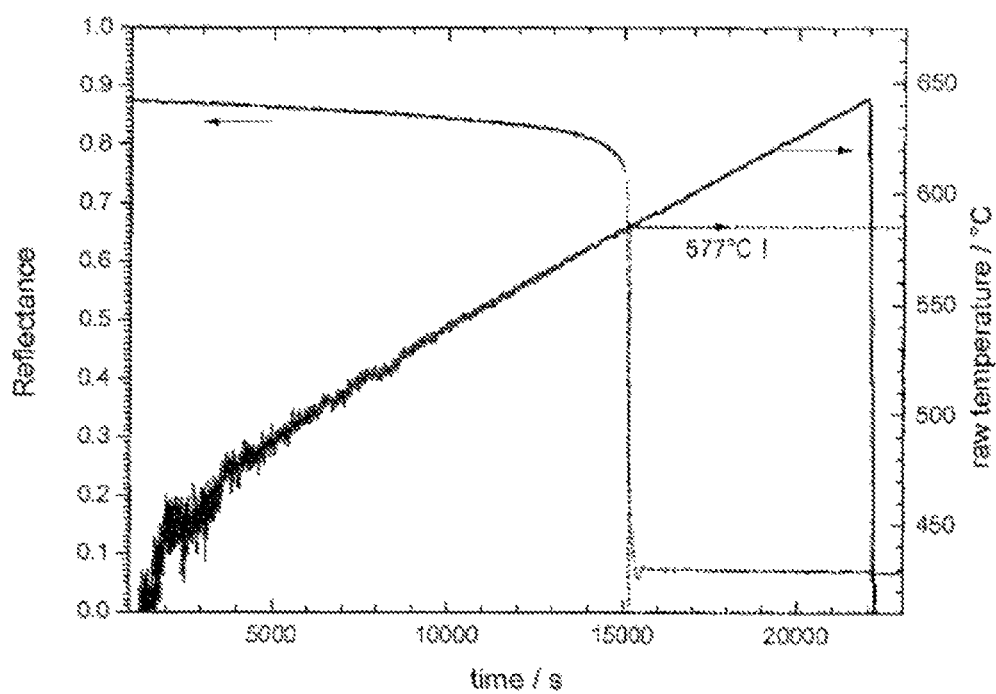
Figure 3:
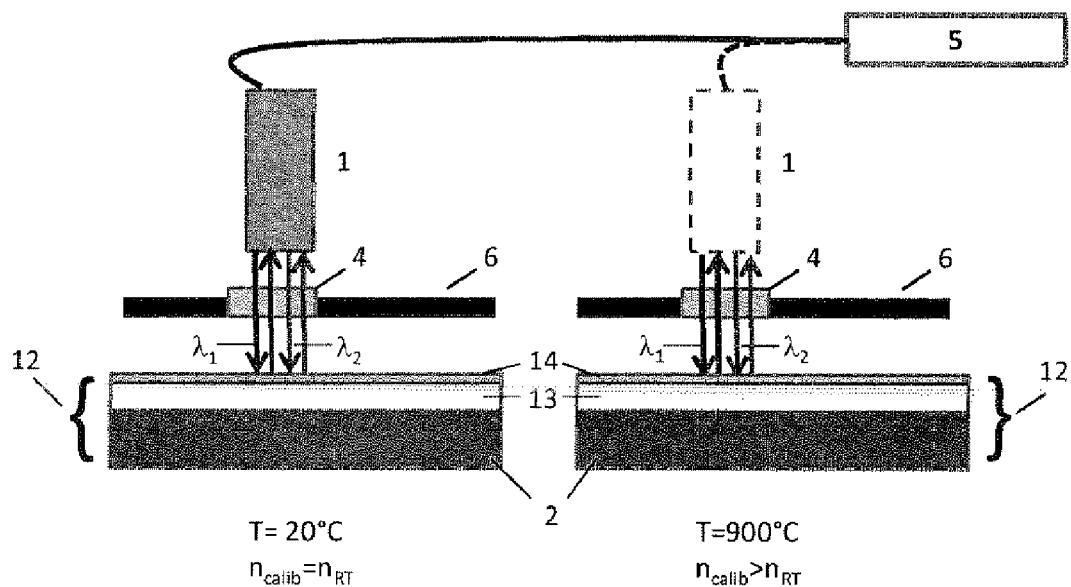
FIG. 3 shows an apparatus for the calibration of a pyrometer according to a preferred embodiment of the present invention and illustrates the related method for the calibration of a pyrometer according to this preferred embodiment, FIG. 4 the measured and determined data according to the method of the present invention described in connection with FIG. 3.

FIG. 3 shows an apparatus for the calibration of a pyrometer according to a preferred embodiment of the present invention and illustrates the related method for the calibration of the pyrometer. The apparatus for calibration comprises a sensing head 1 comprising a pyrometer which needs to be calibrated, i.e. at least one thermal radiation signal measured by said pyrometer has to be assigned to an accurate temperature value of the calibration sample 12. The apparatus further comprises a first light source (not separately shown, i.e. said light source is included in the sensing head 1, the sensing head 1 also comprising the pyrometer, the first optical detector, the second light source and the second optical detector, however, it is alternatively possible that the pyrometer, the first light source, the first optical detector, the second light source and the second optical detector are separately arranged at the window 4 outside the processing chamber 6 such the pyrometer is adapted to measure a thermal radiation signal received from a calibration sample 12, and the light sources are adapted to irradiate light onto the calibration sample 12 and the detectors are adapted to measure respective reflected light from the calibration sample 12). The first light source and the first detector are operated at a first wavelength and the second light source and the second detector are operated at a second wavelength being different to the first wavelength.

FIG. 3 illustrates the apparatus in two different states, i.e. in a first state at a low temperature of 20° C. and in a second state at a high temperature of 900° C., i.e. the elements 1-6 and 12-14 exist only once. The calibration sample 12 comprises a semiconducting wafer 2, a transparent calibration layer 13 and a thin (chemically inert) transparent protection layer 14. The function of the transparent calibration layer 13 is that its refractive index varies (increases) with the temperature and therefore the reflection signal will be modulated according to the temperature of the transparent calibration layer 13. The function of the transparent protection layer 14 is to protect the transparent calibration layer 13 from unwanted reactions at high temperatures within the processing chamber 6 so that the calibration sample 12 can be used multiple times for calibrating a pyrometer. The reflection of the light which is irradiated onto the calibration sample 12 is measured in a wavelength range in which the transparent calibration layer 13 is transparent. The semiconducting wafer 2 of the calibration sample 12 is identical to a semiconducting wafer (in terms of dimensions and material) which is intended to be manufactured inside the processing chamber 6 after the pyrometer has been calibrated. That is, the thermal characteristics of the calibration sample 12 and the semiconducting wafer (to be manufactured) are nearly identical due to the low layer thicknesses of the transparent calibration layer 13 and the thin transparent protection layer 14.

The refractive index of the transparent calibration layer 13 increases with the temperature during the heating process. The thickness of the transparent calibration layer 13 is appropriately chosen (1-5 µm) such that the product of the refractive index and the layer thickness of the transparent calibration layer 13 corresponds to a multiple (preferably between 10 and 40, more preferably 25) of the wavelength $\lambda_1$ of the first light source and $\lambda_2$ of the second light source. Therefore, a temperature increase (during heating the sample 12) results in a variation of the refractive index of the transparent calibration layer 13 and the resulting oscillations of the reflections signals for wavelengths $\lambda_1$ and $\lambda_2$ are significantly reinforced. Therefore, the reflection signal significantly changes with the temperature. The main idea of the invention is to use the changes of the reflection signals for wavelengths $\lambda_1$ and $\lambda_2$ to determine the exact temperature of the calibration sample 12.

Figure 4:
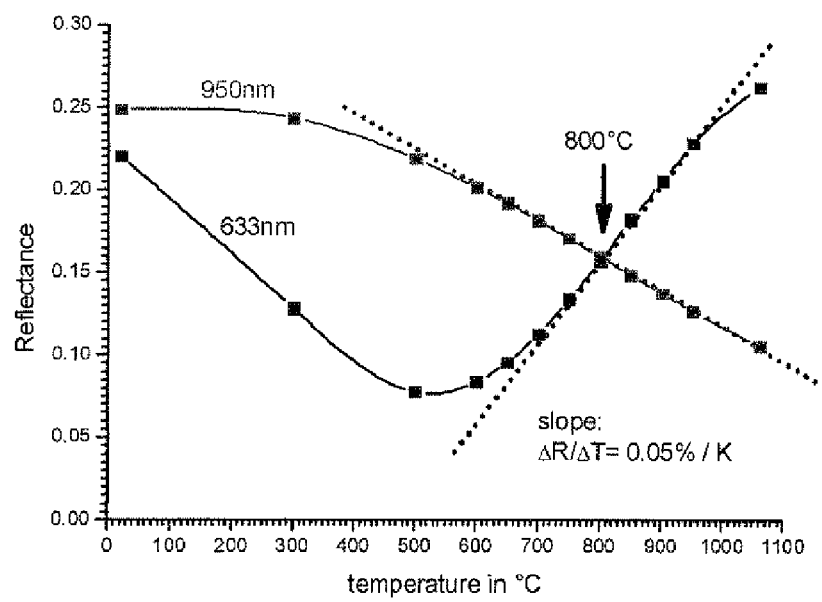

FIG. 4 shows the variation of the reflection intensities (and therefore the variation of the respective reflectances) due to said increase of the refractive index with the temperature. The reflection intensities are measured for wavelengths $\lambda_1$ and $\lambda_2$ many times and the respective reflectances are determined. Thus, it is possible to obtain a reflection signature for wavelengths $\lambda_1$ and $\lambda_2$. In the present case of FIGS. 3 and 4, a sapphire wafer 2 coated with a 3000 nm thick GaN calibration layer 13 is used. The first wavelength $\lambda_1$ is 633 nm and the second wavelength $\lambda_2$ is 950 nm. As can be seen from FIG. 4, the Fabry Perot oscillations change differently with the temperature and therefore the exact temperature of the calibration sample 12 can be obtained from the ratio of the reflectances for the wavelengths $\lambda_1$ and $\lambda_2$. For example, in the present case the layer thickness of the calibration layer 13 is adapted such that the Fabry Perot oscillations cross each other at 800°

C., i.e. the ratio of the reflectances is 1 which can be calculated according to mathematical formulae. Therefore the measured thermal radiation of the pyrometer can be assigned with 800° C. (for example) when the ratio of the reflectances is 1. For other ratios it is possible to calculate the exact temperature and therefore a plurality of measured thermal radiation signals may be assigned to a plurality of exact temperature values. Therefore it is possible to carry out calibration for higher temperatures such as more than 1000° C. which is not possible according to the conventional method discussed in the introductory portion of the present invention. The calibration method of the present invention results in a calibration accuracy of 1K or better.

Figure 5:
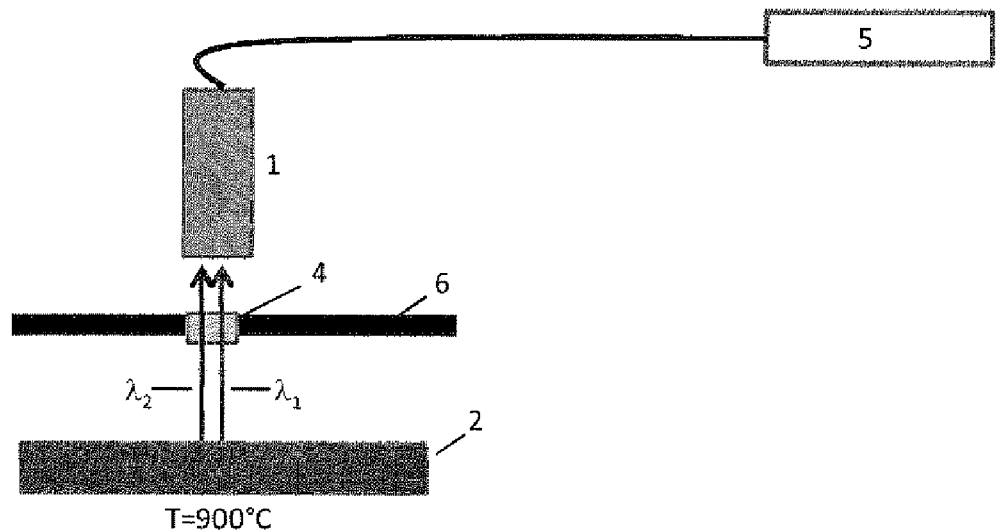
FIG. 5 shows an apparatus for the verification of the calibration of a pyrometer as well as the determination of the temperature of a semiconducting wafer during manufacturing according to a preferred embodiment of the present invention and illustrates the related method thereof.

In order to verify the calibration accuracy during the manufacturing process, for example to exclude mistakes of operation such as a too high temperature gradient during heating, the calibration sample 12 is replaced by a non-coated semiconducting wafer 2 as shown in FIG. 5. The non-coated semiconducting wafer 2 may act as a calibration verification sample 12 or as the semiconducting wafer to be manufactured, i.e. the verification may also be carried out during manufacturing of the semiconducting wafer.

In this regard, the method comprises: heating the non-coated semiconducting wafer 2 to a predetermined temperature such as 900° C., measuring, by the sensing head 1 (comprising the pyrometer) first thermal radiation signal of a first wavelength $\lambda_1$=633 mm of the non-coated semiconducting wafer 2, and measuring, by the pyrometer, a second thermal radiation signal of a second wavelength $\lambda_2$=950 nm of the non-coated semiconducting wafer 2, and determining (verifying) the exact temperature of the non-coated semiconducting wafer 2 from the ratio of the first thermal radiation signal and the second thermal radiation signal. That is, the exact temperature can be accurately determined from the measured thermal radiation signal of one of the first and second wavelength due to the fact that the pyrometer has been calibrated before as described in FIGS. 3 and 4. However, in order to verify the accuracy of the calibrated pyrometer measurement, it is preferred that a second thermal radiation signal is measured and the exact temperature of the non-coated semiconducting wafer 2 is verified from the ratio of the first thermal radiation signal and the second thermal radiation signal.

Figure 6:
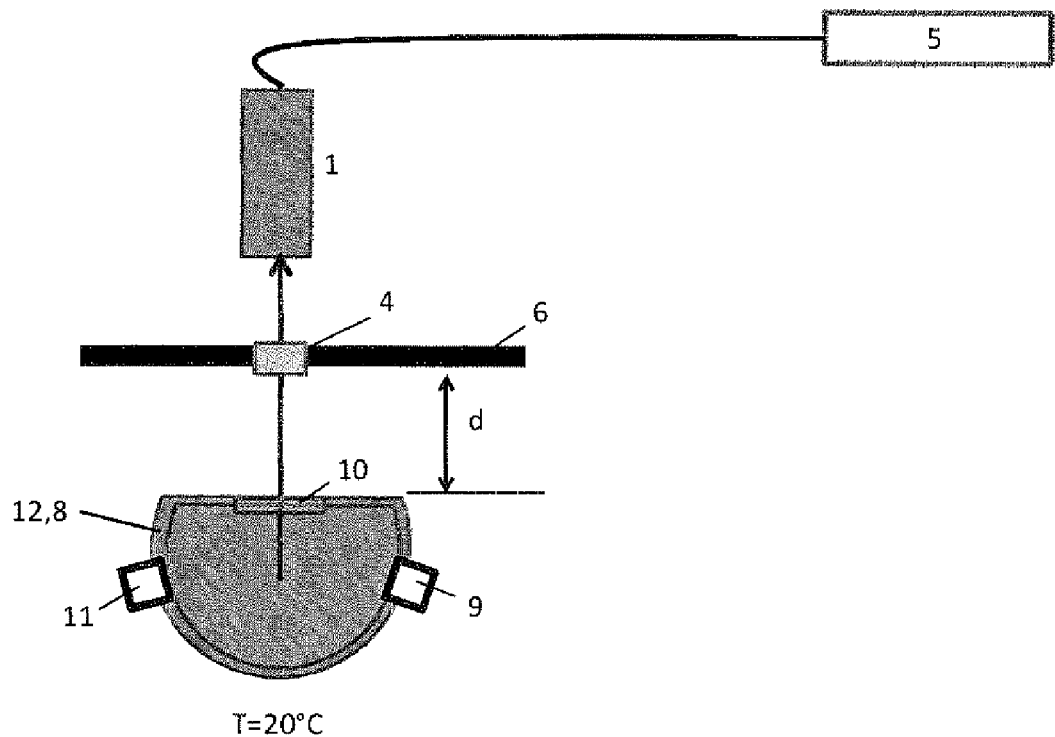
FIG. 6 shows an apparatus for calibration of a pyrometer according to another preferred embodiment of the present invention and illustrates the related method for the calibration of a pyrometer according to this preferred embodiment.

FIG. 6 shows an apparatus for the calibration of a pyrometer according to another preferred embodiment of the present invention and illustrates the related method for the calibration of the pyrometer. The apparatus comprises an integrating sphere 8 (acting as the calibration sample 12), the integrating sphere 8 comprising an opening 10, a detector 9 and a light source 11. The opening 10 corresponds with a semiconducting wafer that is intended to be manufactured after the calibration process in terms of size and position inside the processing chamber 6. That is, the surface area of the semiconducting wafer 2 corresponds with the surface area of the window plate 10 of the integrating sphere 8. The window plate 10 of the integrating sphere 8 faces towards that window 4 of the processing chamber 6 through which the thermal radiation is received by the pyrometer 1. The intensity of the radiation emitted by the integrating sphere 8 can be controlled and adjusted by means of a controller and a reference detector. Furthermore, the wavelength of the radiation emitted by the integrating sphere 8 is the same as the detection wavelength of the pyrometer 1, i.e. the wavelength (characterized by central wavelength and band-width) for which the detection of the pyrometer is sensitive and pre-calibrated to.

The integrating sphere 8 and the processing chamber 6 are not heated during the calibration process. Due to the emission of the integrating sphere 8, the integrating sphere 8 simulates a hot radiating wafer or a hot transparent (through-passing) wafer on an radiating susceptor/wafer-carrier in terms of thermal radiation. That is, the integrating sphere 8 simulates a semiconducting wafer of a known temperature in terms of thermal radiation. The radiation density is adjusted (by comparison with a calibration radiation source) to the radiation density of the known temperature by the controller. Therefore, the integrating sphere 8 comprises a detector 9 which measures the radiation density inside the integrating sphere 8 and the controller is adapted to control the radiation density inside the integrating sphere 8 such that the maximum radiation density inside the integrating sphere 8 is stabilised according to the known temperature. The window plate 10 of the integrating sphere 8 becomes a "cold" homogenous radiating surface which simulates a "hot" homogeneous thermally radiating semiconductor wafer inside the processing chamber 6. Therefore the pyrometer 1 can be calibrated using the predefined thermal radiation corresponding to a predefined temperature of the wafer by assigning the predefined thermal radiation with the predefined temperature.

LIST OF REFERENCE SIGNS 1 sensing head/pyrometer/detector/light source
2 wafer/substrate
3 aluminium layer
4 window of the processing chamber
5 data processing unit
6 processing chamber
8 integrating sphere
9 detector of integrating sphere
10 window plate in integrating sphere
11 light source (LED) of integrating sphere
12 calibration sample
13 transparent calibration layer
14 transparent protection layer

What is claimed is:

1. Method for calibrating a pyrometer (1) adapted to intercept and measure thermal radiation, wherein at least one measured thermal radiation signal is assigned with a temperature value, the method comprising:
    providing a calibration sample (12), wherein the calibration sample (12) comprises a semiconducting wafer (2) and a transparent calibration layer (13) disposed on the semiconducting wafer (2),
    heating the calibration sample (12),
    during the heating process:
        irradiating a first optical radiation having a first wavelength onto the calibration sample (12), measuring a first reflection signal resulting from reflection of the first radiation on the calibration sample (12), and determining a first reflectance of the calibration sample (12) for the first wavelength from the measured first reflection signal,
        irradiating a second optical radiation having a second wavelength onto the calibration sample (12), the first wavelength and the second wavelength being different from each other, measuring a second reflection signal resulting from reflection of the second radiation on the calibration sample (12), and determining a second reflectance of the calibration sample (12) for the second wavelength from the measured second reflection signal, and
        measuring, by the pyrometer (1), a thermal radiation signal received from the calibration sample (12),
    wherein a temperature of the calibration sample (12) is determined from the ratio of the first reflectance and the second reflectance and wherein the pyrometer (1) is calibrated by assigning the determined temperature of the calibration sample (12) with the thermal radiation signal measured by the pyrometer (1).

2. The method of claim 1, wherein the steps of
irradiating the first optical radiation,
measuring the first reflection signal,
irradiating the second optical radiation,
measuring a second reflection signal, and
measuring the thermal radiation signal,
are simultaneously carried out.

3. The method of claim 2, wherein the calibration sample (12) is continuously heated, and/or wherein the calibration sample (12) is heated with a temperature gradient ranging between 0.1K/min and 10K/min and/or the calibration sample (12) is continuously heated up to a temperature between 500° C. and 1200° C.

4. The method of claim 1, wherein the transparent calibration layer (13) comprises an optical transparency for the first optical radiation and the second optical radiation of 0.5 or more and/or wherein the transparent calibration layer (13) comprises a thickness ranging between 1 μm and 5 μm and/or wherein the transparent calibration layer (13) consists of gallium nitride.

5. The method of claim 4, wherein the calibration sample (12) further comprises a transparent protection layer (14), the transparent protection layer (14) being disposed on the transparent calibration layer (13).

6. The method of claim 1, wherein the first optical radiation and the second optical radiation have a central wavelength ranging between 380 nm and 1300 nm, and/or wherein the first optical radiation and the second optical radiation comprise a full width at half maximum (FWHM) ranging between 0.1 nm and 20 nm, and/or wherein the absolute value of the difference between the wavelength of the first optical radiation and the wavelength of the second optical radiation ranges between 5 nm and 600 nm.

7. The method of claim 1, wherein the first optical radiation and the second optical radiation are perpendicularly irradiated onto the calibration sample (12) with respect to the surface of the calibration sample (12).

8. The method of claim 1, further comprising:
continuously heating the calibration sample (12) for a predetermined temperature range, and during the continuous heating process:
continuously measuring the thermal radiation signal, continuously irradiating the first optical radiation having the first wavelength onto the calibration sample (12), continuously measuring the first reflection signal and continuously determining first reflectance values of the calibration sample (12),
wherein a second temperature of the calibration sample (12) is determined from a minimum of the reflectance values and wherein the second temperature is assigned with the measured thermal radiation signal which was measured during the time at which the minimum reflectance value was measured, and
wherein the second temperature determined from the minimum of the reflectance values is compared with the first temperature determined from the ratio of the first reflectance and the second reflectance.

9. The method according to claim 1, further comprising a verification of the calibration of the pyrometer (1), the verification comprising:
replacing the calibration sample (12) or replacing an integrating sphere (8) by a non-coated semiconducting wafer (2),
heating the non-coated semiconducting wafer (2) to a predetermined temperature,
measuring, by the pyrometer (1), a second thermal radiation signal of a third wavelength of the non-coated semiconducting wafer (2),
measuring, by the pyrometer (1), a third thermal radiation signal of a fourth wavelength of the non-coated semiconducting wafer (2), the third wavelength and the fourth wavelength being different from each other,
determining a first temperature of the non-coated semiconducting wafer (2) from the ratio of the second thermal radiation signal and the third thermal radiation signal, and
wherein the calibration of the pyrometer (1) is verified by assigning the determined first temperature of the non-coated semiconducting wafer (2) with at least one of the second thermal radiation signal measured by the pyrometer (1) and the third thermal radiation signal measured by the pyrometer (1), and comparing the assigned first temperature with the previously assigned temperature.

10. Method for determining the temperature of a semiconducting wafer (2) which is located within a processing chamber (10) by using a pyrometer (1), the method comprising:
calibrating the pyrometer (1),
measuring a thermal radiation which is emitted by the semiconducting wafer (2) due to its temperature by using the pyrometer (1),
wherein the pyrometer (1) is located outside the processing chamber (10) and the thermal radiation is received by the pyrometer (1) after passing through a window (11) of the processing chamber (10), and
determining the temperature of the semiconducting wafer (2) from the measured thermal radiation,
wherein the pyrometer (1) is calibrated according to the method of claim 1.

11. The method according to claim 10, wherein a surface area of the semiconducting wafer (2) corresponds with the surface area of an opening (10) of the integrating sphere (8) and/or wherein the surface area of the semiconducting wafer (2) corresponds with the surface area of the calibration sample (12).

12. System adapted for determining the temperature of a semiconducting wafer (2) according to claim 10, the system comprising: the calibration sample (12), wherein the calibration sample (12) comprises the semiconducting wafer (2) and the transparent calibration layer (13) disposed on the semiconducting wafer (2), the pyrometer (1) adapted to intercept and measure thermal radiation, and adapted to measure the first thermal radiation signal received from the calibration sample (12), and adapted to measure the thermal radiation which is emitted by the semiconducting wafer (2) due to its temperature,
a first light source and first optical detector, adapted to irradiate the first optical radiation having the first wavelength onto the calibration sample (12), measuring the first reflection signal resulting from reflection of the first radiation on the calibration sample (12), and
determining the first reflectance of the calibration sample (12) for the first wavelength from the measured first reflection signal,
a second light source and a second optical detector, adapted to irradiate the second optical radiation having the second wavelength different from the first wavelength onto the calibration sample (12),
measuring the second reflection signal resulting from reflection of the second radiation on the calibration sample (12), and determining the second reflectance of the calibration sample (12) for the second wavelength from the measured first reflection signal, wherein the system further comprises a control unit adapted to calibrate the pyrometer.

13. The system according to claim 12, wherein the first optical detector is used as the detector of the pyrometer (1) or wherein the first optical detector is used as a first detector of the pyrometer (1) and the second optical detector is used as a second detector of the pyrometer (1).

14. The system according to claim 13, wherein the first optical detector is alternately switched in a first mode for measuring the thermal radiation which is emitted by the semiconducting wafer (2) due to its temperature and in a second mode for measuring the second reflection signal resulting from reflection of the second radiation on the calibration sample (12) and/or wherein the second optical detector is alternately switched in a first mode for measuring the thermal radiation which is emitted by the semiconducting wafer (2) due to its temperature and in a second mode for measuring the second reflection signal resulting from reflection of the second radiation on the calibration sample (12).

15. Method for calibrating a pyrometer (1) adapted to intercept and measure thermal radiation, wherein at least one measured thermal radiation signal is assigned with a temperature value, the method comprising:

providing an integrating sphere (8), irradiating the integrating sphere (8) with radiation corresponding to a predetermined temperature and to a wavelength detection characteristics of the pyrometer, wherein the radiation which is irradiated into the integrating sphere (8) is calibrated by comparison of a flux density leaving through a window plate (10) with the emitted light of a calibrated black-body source and stabilized according to the predetermined radiation-temperature using a detector (8) which is located inside the integrating sphere (8), measuring, by the pyrometer (1), a thermal radiation signal of the integrating sphere (8), determining an apparent temperature of the integrating sphere (8) from measured thermal radiation signal of the integrating sphere (8), and wherein the pyrometer (1) is calibrated by assigning the pre-determined radiation temperature of the integrating sphere (8) with the thermal radiation signal measured by the pyrometer (1).

* * * * *